United States Patent
Knapp et al.

(10) Patent No.: US 6,687,977 B2
(45) Date of Patent: Feb. 10, 2004

(54) CPP MAGNETORESISTIVE DEVICE AND METHOD FOR MAKING SAME

(75) Inventors: Kenneth E. Knapp, Livermore, CA (US); Ronald A. Barr, Mountain View, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 37 days.

(21) Appl. No.: 09/785,752

(22) Filed: Feb. 20, 2001

(65) Prior Publication Data

US 2001/0038516 A1 Nov. 8, 2001

Related U.S. Application Data

(62) Division of application No. 09/571,440, filed on May 15, 2000, now Pat. No. 6,233,125, which is a division of application No. 09/184,120, filed on Nov. 2, 1998, now Pat. No. 6,118,638.

(51) Int. Cl.[7] ............................. G11B 5/127; H04R 31/00
(52) U.S. Cl. ............... 29/603.15; 29/603.7; 29/603.13; 29/603.18; 29/603.16; 360/324.2; 360/324
(58) Field of Search ............ 29/603.07, 603.13–603.18, 29/603.01, 603.2; 360/126, 317, 318, 314, 315, 316, 324.2, 324; 216/39, 41, 48

(56) References Cited

U.S. PATENT DOCUMENTS

| | | | | | |
|---|---|---|---|---|---|
| 4,127,884 A | * | 11/1978 | Nouchi et al. | ............... | 360/119 |
| 5,270,894 A | * | 12/1993 | Okuda et al. | ............... | 360/126 |
| 5,278,716 A | * | 1/1994 | Okuda et al. | ............... | 360/126 |
| 5,726,837 A | * | 3/1998 | Nakatani et al. | ......... | 360/324.2 |
| 6,129,957 A | * | 10/2000 | Xiao et al. | ................... | 427/548 |
| 6,154,348 A | * | 11/2000 | Suzuki | ........................ | 360/324 |

* cited by examiner

Primary Examiner—Peter Vo
Assistant Examiner—Paul Kim
(74) Attorney, Agent, or Firm—Nathan N. Kallman (57) ABSTRACT

A magnetoresistive device includes a metal layer, formed over a substrate, in which a groove is formed. A magnetoresistive element is formed in the groove, forming two magnetoresistive element portions that are separated by a conductive element. A sense current applied to the metal layer flows through the two magnetoresistive element portions with a predominant current-perpendicular-to-plane component. The method includes techniques that are less complex and less expensive than submicron photolithography to form the above described magnetoresistive device with submicron geometries.

9 Claims, 7 Drawing Sheets

CPP MAGNETORESISTIVE DEVICE AND METHOD FOR MAKING SAME

This is a division of application Ser. No. 09/571,440 filed May 15, 2000, now U.S. Pat. No. 6,233,125 which is a division of application Ser. No. 09/184,120 filed Nov. 2, 1998, now U.S. Pat. No. 6,118,638.

BACKGROUND OF THE INVENTION

This invention relates generally to magnetic disk drives, more particularly to magnetoresistive (MR) read heads, and most particularly to methods and structures for current-perpendicular-to-plane operation of submicron MR heads.

Figure 1A:
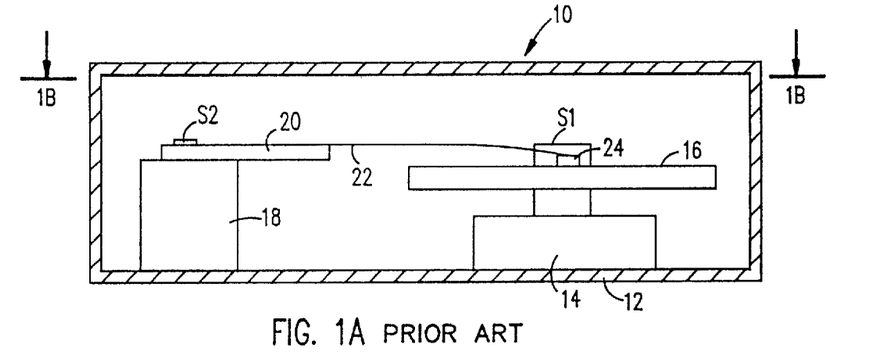
FIG. 1A is a partial cross-sectional front elevation view of a magnetic disk drive assembly.
Figure 1B:
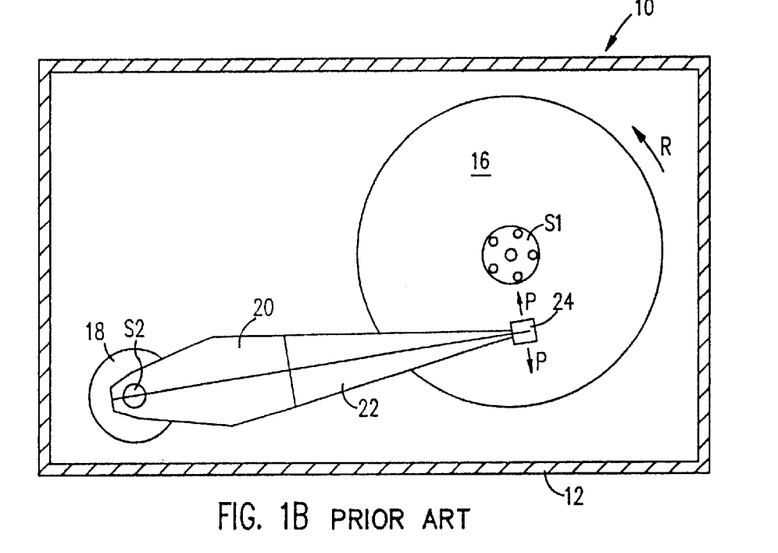
FIG. 1B is a top plan view taken along line 1B—1B of FIG. 1A.

Magnetic disk drives are used to store and retrieve data for digital electronic apparatuses such as computers. In FIGS. 1A and 1B, a magnetic disk drive 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (shown in FIG. 1C). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Various magnetic "tracks" of information can be read from the magnetic disk 16 as the actuator 18 causes the transducer 24 to pivot in a short arc as indicated by the arrows P. The design and manufacture of magnetic disk drives is well known to those skilled in the art.

Figure 1C:
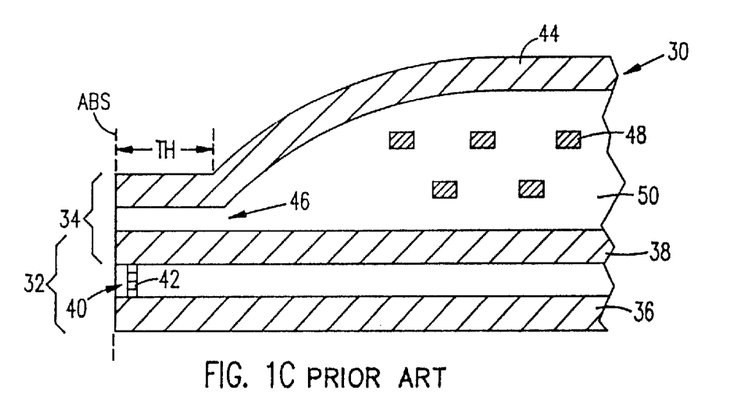
FIG. 1C is a cross-sectional side view of a read-write head incorporating a multilayer magnetoresistive read sensor.

FIG. 1C depicts a magnetic read/write head 30 including a read element 32 and a write element 34. The edges of the read element 32 and write element 34 also define an air bearing surface, ABS, which faces the surface of the magnetic disk 16.

Read element 32 includes a first shield 36, a second shield 38, and a read sensor 40 located between the first shield 36 and the second shield 38. One type of such as anisotropic magnetoresistive (AMR), spin valve, and giant magnetoresistive (GMR). The particular read sensor 40 shown is a multilayer GMR, formed of successive layer pairs 42 of various materials. Such an MR device typically can be formed by depositing the layer pairs 42 one upon the next to form a multilayer wafer (not shown). The material of each layer and the ordering of layers are appropriately selected to achieve a desired read performance. Multiple portions of the wafer are then removed to provide multiple read sensors 40.

Figure 1D:
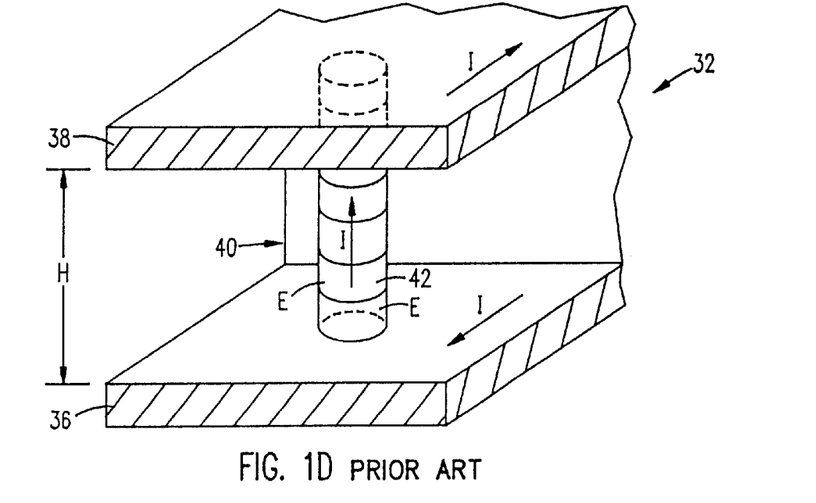
FIG. 1D is a perspective view of the read element of FIG. 1C.

The operation of the read element 32 can be better understood with reference to the perspective view of read element 34 in FIG. 1D. A sense current I is caused to flow through the read sensor. While here the sense current is shown injected through the shields, other configurations have the read sensor electrically isolated from the shields, with additional leads injecting the sense current I. As the sense current passes through, the read sensor exhibits a resistive response, which results in a particular output voltage. The higher the output voltage, the greater the precision and sensitivity of the read sensor in sensing magnetic fields from the magnetic medium 16.

The output voltage is affected by various characteristics of the read element 32. For example, the greater the component of the sense current I that flows across the read sensor layers, the greater the output voltage. This component of the sense current I is called the current-perpendicular-to-plane component, CPP. On the other hand, the component of the sense current I that flows along the read sensor layers 42 is the current-in-plane, CIP, which results in lower output voltage. In the configuration of FIG. 1D, the first and second shields 36, 38 are conductive and are in electrical contact with the read sensor 40. Here, the sense current I of the read sensor 40 flows, for example, from the first shield 36 to the second shield 38 through the read sensor 40. As the sense current I flows through the read sensor 40, the current flows substantially perpendicularly to the orientation of the layers 42 of the read sensor 40. Thus, substantially all of the sense current I is CPP. Other read sensors may be designed to operate with varying CPP and CIP components of the sense current. However, it is desirable to maximize the CPP component to maximize the output voltage of the read sensor. The design and manufacture of magnetoresistive heads, such as read sensor 40, are well known to those skilled in the art.

Write element 34 is typically an inductive write element and includes a first yoke element 44 and the second shield 38, which forms a second yoke element, defining a write gap 46 therebetween. The first yoke element 44 and second yoke element 38 are configured and arranged relative to each other such that the write gap 46 has a particular throat height, TH. Also included in write element 34, is a conductive coil 48 that is positioned within a dielectric medium 50. As is well known to those skilled in the art, these elements operate to magnetically write data on a magnetic medium such as a magnetic disk 16.

Although current MR read sensors such as read sensor 40 have been used in the past, their performance is limited. In particular, their output voltage is limited by various factors such as cross-sectional area that is normal to the sense current vector (i.e., decreasing output voltage with increasing area), and the device length that is parallel to the sense current vector (i.e., decreasing output voltage with decreasing length). With demand for increasingly smaller read/write heads, the shield-to-shield height H between the read element first and second shields 38, 44 is increasingly smaller, thus leaving increasingly less space to accommodate the read sensor 46. Thus, in a read sensor such as shown in FIG. 1D, decreasing height H results in decreasing device length, thereby reducing the sensor output voltage. Furthermore, even without limitations on device length, GMR multilayer properties have been found to degrade as the number of multilayers (i.e., layer pairs) increases. In particular, degradation has occurred above 20–30 multilayers.

In addition to the limitations of currently available materials, edges E (shown in FIG. 1D) of each layer in a multilayer device can be damaged in the fabrication process. For example, during a cutting operation to remove a single read sensor from a wafer, materials from individual layers may be smeared along the layer edges. Thus, the sense current I traveling perpendicular to the layers may be shunted at the edges, thereby reducing the effectiveness of the sense current I to drive the MR read sensor.

Also, the fabrication of read sensors is becoming increasingly more complex and expensive as increasingly smaller MR read/write devices are sought by users. Particularly, designs are being driven to submicron geometry scales. Such geometries are typically formed by direct photolithographic techniques which are more time and cost consuming. In addition to the challenges of the device size itself fabrication tolerances are accordingly becoming increasingly smaller.

Thus, what is desired is an MR head, and method for making the same, that has increased performance, while limiting cost and complexity, even at increasingly smaller MR head sizes.

SUMMARY OF THE INVENTION

The present invention provides an MR head and method for making the same that provides higher performance and fabrication with less cost and complexity. This is accomplished by providing a CPP MR read sensor that is formed in a groove between two conductors by a method that can be performed with submicron precision, and that results in the sense current passing twice through the MR thickness. Thus, twice as many layers of MR material are used without increasing the shield-to-shield height H. Further, the method for making the MR head uses thin film processes, deposition, and etching to define the submicron geometries.

According to an embodiment of the present invention, a magnetoresistive device includes a metal layer that is formed over a substrate. The metal layer is provided with a groove that has first and second angled walls. More particularly, the first angled wall forms a terminus of a first portion of the metal layer and the second angled wall forms a terminus of a second portion of the metal layer. In addition, a first plurality of layers of materials that exhibit a magnetoresistive effect when exposed to a magnetic field and an electric current, is formed along the first angled wall. Also, a second plurality of layers of materials that exhibit a magnetoresistive effect when exposed to a magnetic field and an electric current, is formed along the second angled wall. A conductive element, further, lies between and is in electrical and physical contact with the first and second plurality of layers. As such, when an electric current flows through one of the first and second portions of the metal layer, at least a component of the electric current flows approximately perpendicularly to the first and second plurality of layers and through the other of the first and second portions of the metal layer. Preferably, the above mentioned component of the electric current is the predominant component.

In another embodiment of the present invention, a system for reading from and writing to magnetic media includes a read/write head that includes a write element for recording data on the magnetic media, and a read element for reading data from the magnetic media. In particular, the write element is configured to use a first current to create a first magnetic field in the vicinity of said write element. The read element includes a metal layer that has a groove. Within this groove a magnetoresistive element is formed, through which a second current is injected to detect a second magnetic field in the vicinity of the magnetic media.

In yet another embodiment of the present invention, a method of fabricating a magnetoresistive device that is capable of reading data that is recorded on magnetic media includes providing a substrate on which a first conductive element is formed. A second conductive element is also formed on the substrate to form a main conductive layer along with the first conductive element. More specifically, the first and second conductive elements are separated by a conductor separation gap. Further, a groove is formed in the main conductive layer substantially coincident with the conductor separation gap, and is defined by a first angled wall of the first conductive element, and a second angled wall of the second conductive element.

The method also includes forming a magnetoresistive element within the groove and in electrical contact with the first and second conductive elements. Particularly, the magnetoresistive element is formed such that there is an element gap between a magnetoresistive element first portion and a magnetoresistive element second portion. Additionally, a third conductive element is formed within the element gap, in electrical contact with the first and second magnetoresistive element portions. Thus, when an electrical current is passed through the main conductive element, the electrical current also passes through the third conductive element and through the first and second magnetoresistive element portions. Preferably, the electrical current passes through the first and second magnetoresistive element portions with a predominant current-perpendicular-to-plane component.

The various embodiments of the present invention enable the reading of magnetic media at higher performance levels by smaller read/write heads. Further, these advantages are gained while maintaining low manufacturing time, cost, and complexity. More specifically, the various embodiments of the present invention provide for a read sensor having submicron geometries that can be formed without using expensive submicron photolithography techniques, and that perform with a predominant CPP sense current component. In some embodiments, the read sensor further operates with reduced shunting of the sense current. Additionally, as a read device in a read/write head, the present invention can be practiced with fabrication of the read device either before or after the fabrication of the write device, rather than being limited to a conventional read-then-write fabrication sequence.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

FIGS. 1A–D were discussed with reference to the prior art. FIGS. 2A–K show a cross-sectional view of a read sensor in various stages of fabrication, according to an embodiment of the present invention.

Figure 2A:
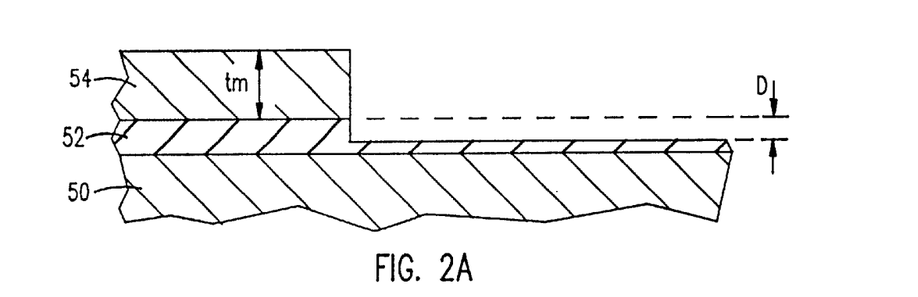
FIG. 2A is a cross-sectional view of a first conductor formed during fabrication of a read sensor, according to an embodiment of the present invention.

During the fabrication of the read sensor, layers are formed over a substrate (not shown), including a first shield layer 50 as shown in FIG. 2A. The first shield layer 50 could be formed of ferromagnetic material, such as NiFe. While the thickness of the first shield layer 50 can be in the range of about 0.1 microns to about 10.0 microns, the thickness is preferably in the range of about 2.0 microns to about 3.0 microns. If a ferromagnetic material is used, a shield insulation layer 52 is then deposited over the first shield layer 50 to insulate the first shield layer 50, from successive layers, such as conductive layers. In this way, electrical shorting is avoided between a sensor, that is to be formed over the first shield layer 50, and the first shield layer 50. For example, insulation can be provided by silicon nitride ($Si_3N_4$). Also, the thickness of this layer can be in the range of about 0.005 microns to about 0.1 micron. Alternatively, although not shown, the first shield layer 50 could be formed of a suitable magnetic material, such as NiZn, MnZn, LiZn, or Ba ferrite. With such a material no additional insulation need be provided by a shield insulation layer 52, and thus the shield-to-shield spacing H (see FIG. 1D) can be reduced without electrical shorting of a subsequently formed sensor to the shields. As a further alternative, in an unshielded embodiment, an alumina (i.e., aluminum oxide) layer, partially encapsulating the read/write head that is to be formed, is the layer upon which subsequent read/write layers are deposited.

With continuing reference to FIG. 2A, a first metal layer 54 is deposited above the shield insulation layer 52. The first metal layer 54 may be formed of one or more materials that exhibit appropriate conductivity properties. For example, the first metal layer 54 may be formed by a single layer of tantalum (Ta), molybdenum (Mo), tungsten (W), copper (Cu), or gold (Au). Although the first metal layer 54 is shown as a single layer, alternatively the first metal layer 54 may be formed of multiple layers of various ones of the above mentioned metals. Whether formed by a single layer or multiple layers, a thickness tm of the first metal layer 54 is preferably in the range of about 0.05 microns to about 0.15 microns.

The shield insulation layer 52 and the first metal layer 54, as well as subsequent layers, can be deposited in various ways known to those skilled in the art to be appropriate for the type of materials used, for example, chemical vapor deposition (CVD), plating, or a physical vapor deposition (PVD) method such as direct current (d.c.) or radio frequency (r.f.) diode or magnetron sputtering, ion beam deposition, or cathodic arc deposition. After the first metal layer 54 is deposited, both it and shield insulation layer 52 are etched as shown in FIG. 2A, with the remainder of the first metal layer 54 forming a first conductive element, or first conductor. Also, a portion of the shield insulation layer is etched to a depth D. This etching can be performed using any suitable method known to those skilled in the art. For example, photolithography, reactive ion etching (RIE), or ion milling can be utilized.

Figure 2B:
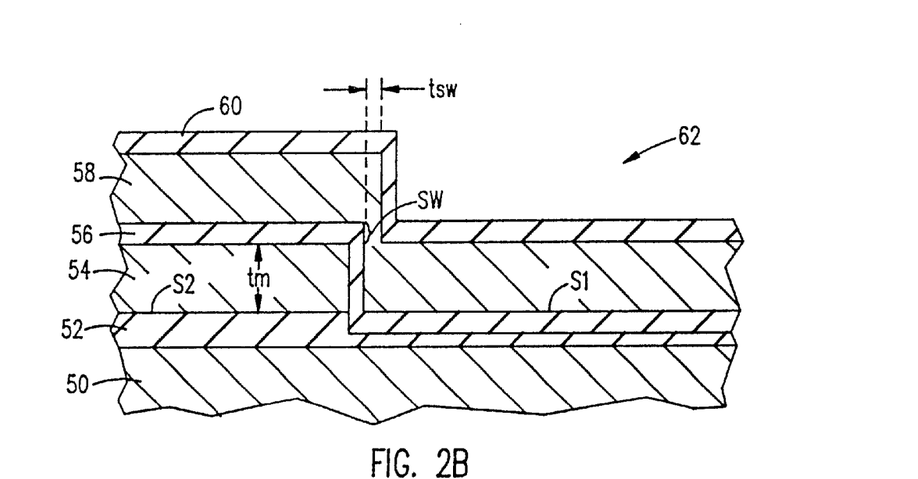
FIG. 2B is a cross-sectional view of the first conductor of FIG. 2A and a second conductor formed during fabrication of a read sensor, according to an embodiment of the present invention.

In FIG. 2B a filler material 56 is deposited over the first conductive element 54 and the shield insulation layer 52, to a thickness that is sufficient to have a top surface, S1, of the filler material 56 lie substantially parallel to a top surface, S2, of the portion of the shield insulation layer 52 that lies under the first conductive element 54. The filler material 56 is later used as a lap stop to facilitate lapping termination, and therefore a material and corresponding thickness that are appropriate for such application is used. For example, the filler material 56 can be silicon nitride ($Si_3N_4$) with a thickness in the range of about 0.05 microns to about 0.5 microns. Therefore, the depth D of the etched shield insulation layer is chosen such that proper deposition of the filler material 56 results in a corresponding thickness that is appropriate for the material used.

A second metal layer 58 is also deposited over the filler material 56 to a thickness that is approximately equal to the thickness tm of the first conductive element 54. The second metal layer 58 is further deposited in a manner that results in a minimal thickness, tsw, of the material being deposited along a portion, or sidewall SW, of the filler material 56 surface. The importance of the value of tsw will be made apparent by the below description regarding FIG. 2D. As is further shown in FIG. 2B, lap stop material 60 is deposited over the second metal layer 58, thereby forming an intermediate read sensor structure 62. As is well known to those skilled in the art, the thickness of and material used for the lap stop material 60 is sufficient to facilitate the termination of a lapping process applied to the top of the lap stop material 60, before lapping substantially all of the lap stop material 60. Preferably, this thickness is approximately equal to the thickness of the filler material 56, and is in the range of about 0.05 microns to about 0.5 microns. The lap stop material 60 can be one of various materials, the suitability of which would be well known to those skilled in the art. For example, using the same material as that used for the fill material 56, such as silicon nitride ($Si_3N_4$), is preferable.

Figure 2C:
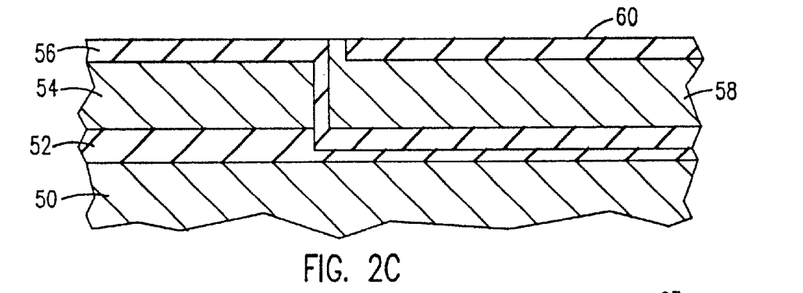
FIG. 2C is a cross-sectional view the first and second conductors of FIG. 2B, after removal of some material, according to an embodiment of the present invention.
Figure 2D:
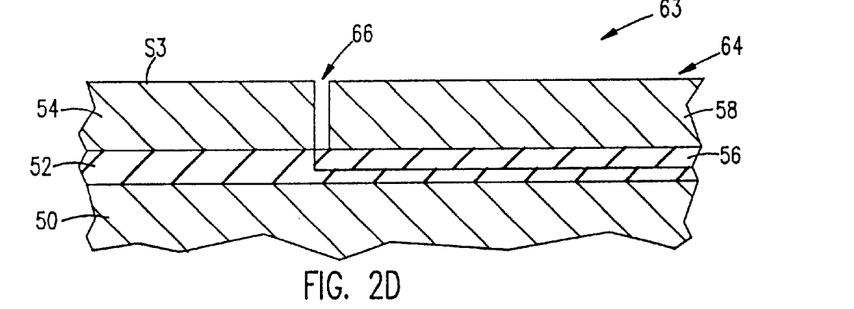
FIG. 2D is a cross-sectional view of the first and second conductors of FIG. 2C, after removal of material to form a gap, according to an embodiment of the present invention.

FIG. 2C depicts the result of such a lapping process. Any suitable lapping process, such as chemical mechanical polishing (CMP), can be used to planarize the surface of the intermediate read sensor structure 62, thereby removing portions of the filler material 56, the second metal layer 58, and the lap stop material 60. FIG. 2D shows the remainder of the second metal layer 58 that forms a second conductive element, or conductor, after removal of the remaining lap stop material 60, those portions of the filler material 56 that were above the first conductor 54 and between the first and second conductive elements 54 and 58, and that portion, with the thickness tsw, of the second metal layer 58 deposited along the sidewall SW of the filler material 58 surface. Various methods known to those skilled in the art can be used to remove these materials, for example, reactive ion etching (RIE). The remaining structure 63 is a metal layer 64, having an upper surface, S3, that is formed over a substrate (the first immediately adjacent layer of which being here formed by the shield insulation layer 52 and the filler material 56). In addition, the metal layer 64 is separated by a gap 66 that was formed by the removal of the filler material 56 from between the first and second conductive elements 54, 58. By minimizing the sidewall deposition, the final read track width and groove angle can be influenced.

Figure 2E:
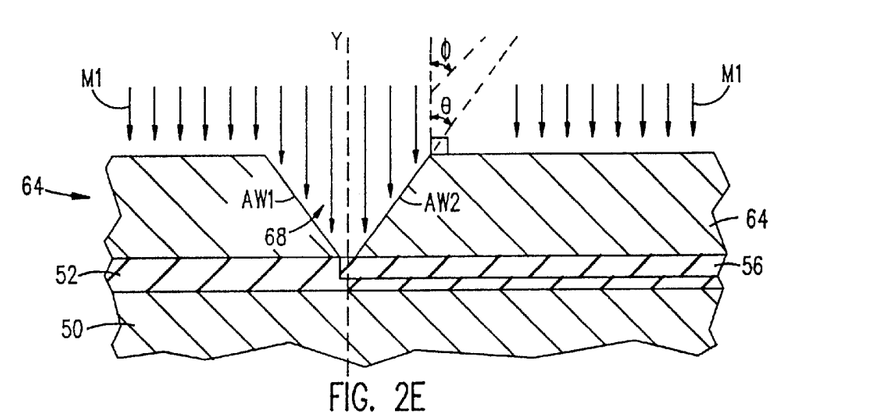
FIG. 2E is a cross-sectional view of the first and second conductors of FIG. 2D after formation of a groove where the gap was in FIG. 2D, according to an embodiment of the present invention.

As depicted in FIG. 2E, the surface S3 of FIG. 2D is subjected to ion milling (represented by arrows M1) at a beam angle $\phi$, measured from an orthogonal of surface S3. Although the beam angle $\phi$ can have various values, the milling of FIG. 2E is at about $\phi=0$ degrees. In addition, the ion milling process can include the spinning of the structure 63 about a groove axis Y that passes through the gap 66, thus improving etch uniformity. Due to the gap 66 (shown in FIG. 2D), the rate of milling in the region of the gap is increased relative to that at the surface S3. As a result, a groove 68 is formed in the metal layer 64, defined by a first angled wall AW1 and a second angled wall AW2. An angle $\theta$ of the first and second angled walls AW1, AW2 will be affected by the selection of the metal layer 64 materials and configuration, the ion beam process, and the width of the gap 66. For example, the configuration of the metal layer 64 will determine the inherent sputter yield as a function of the ion beam angle $\phi$. Further, the ion beam divergence, beam angle $\phi$, and beam energy will influence the angle $\theta$. Given these parameters, the angle $\theta$ can be controlled from 20–70 degrees by appropriate variable selections.

Figure 2F:
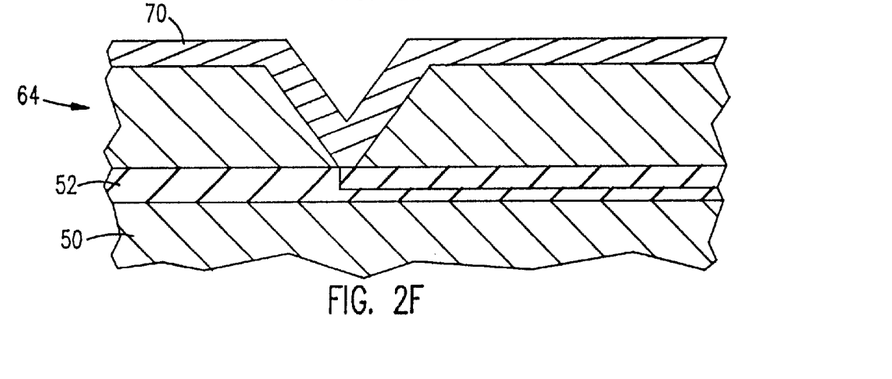
FIG. 2F is a cross-sectional view of the first and second conductors and the groove of FIG. 2E, after magnetoresistive material is deposited in the groove, according to an embodiment of the present invention.

After the groove 68 is milled from the metal layer 64, a magnetoresistive material 70 is deposited over the metal layer 64 and in the groove 68 as shown in FIG. 2F. Although the magnetoresistive material 70 is shown as a single layer, it can be formed by successively depositing various layers above the metal layer 64 and in the groove 68. In particular, the materials of each layer and the ordering of the layers relative to each other are chosen to achieve particular performance by the finished read sensor. For example, a particular configuration of layers would be deposited to form a GMR multilayer read sensor. Also as an example, the magnetoresistive material can have various thicknesses to achieve particular performance and according to the groove angle $\theta$. Exemplary thicknesses are in the range of about 0.01 microns to about 0.5 microns, while thicknesses in the range of about 0.05 microns to about 0.08 microns is preferable.

Figure 2G:
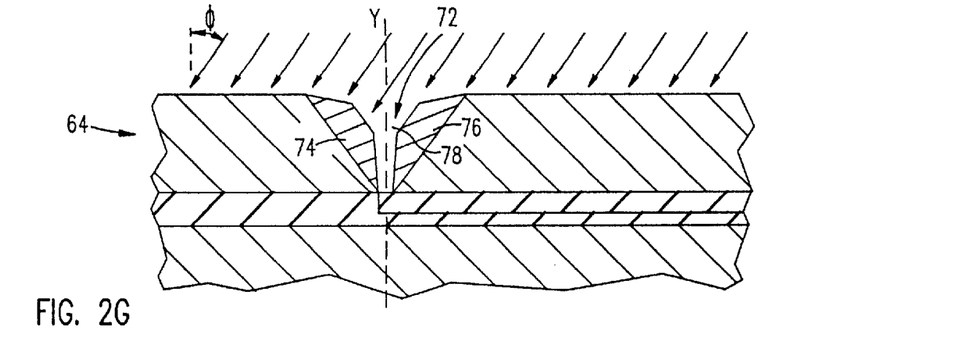
FIG. 2G is a cross-sectional view of the first and second conductors of FIG. 2F, after forming a magnetoresistive (MR) element, according to an embodiment of the present invention.

The formation of a magnetoresistive (MR) element 72 shown in FIG. 2G is accomplished by static (i.e., no rotation of the MR structure) ion milling the MR layer 70 of FIG. 2F. Various beam angles $\phi$ can be used depending upon the desired geometry of the MR element 72 and the materials used to form the MR layer 70. While beam angles in the range of about 0 degrees to about 90 degrees are possible, and about 30 degrees to about 60 degrees are preferable, the ion milling of FIG. 2G is performed with a beam angle of about $\phi=45$ degrees. Further, ion milling is also used to produce an element gap 78 that divides the MR element 72 into a first MR element portion 74 and a second MR element portion 76. The separation of the MR element into two such elements can be verified with a resistance probe measurement after this milling.

Figure 2H:
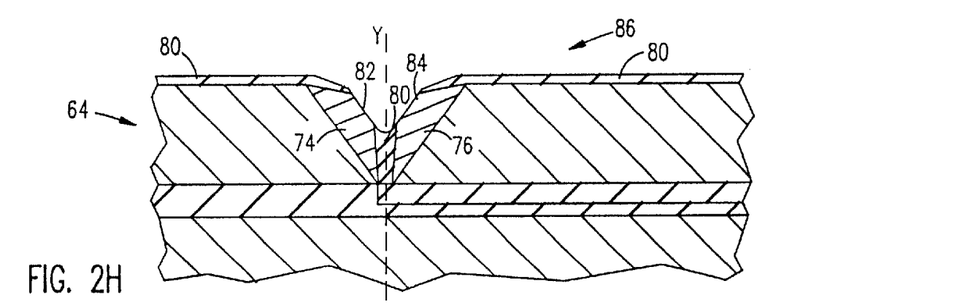
FIG. 2H is a cross-sectional view of deposited and etched MR insulation material between and over portions of the MR element of FIG. 2G, according to an embodiment of the present invention.

As is illustrated by FIG. 2H, magnetoresistive (MR) insulation material 80 is deposited over the metal layer 64 and the MR element 72, filling the element gap 78. Subsequently, portions of the MR insulation material 80 are removed to expose a first face portion 82 of the first MR element portion 74, and a second face portion 84 of the second MR element portion 76. The MR insulation material 80 is removed by ion milling at selected angles $\phi$ (here $\phi$ is about 0 degrees), while rotating the structure 86 about the groove axis Y.

Figure 2I:
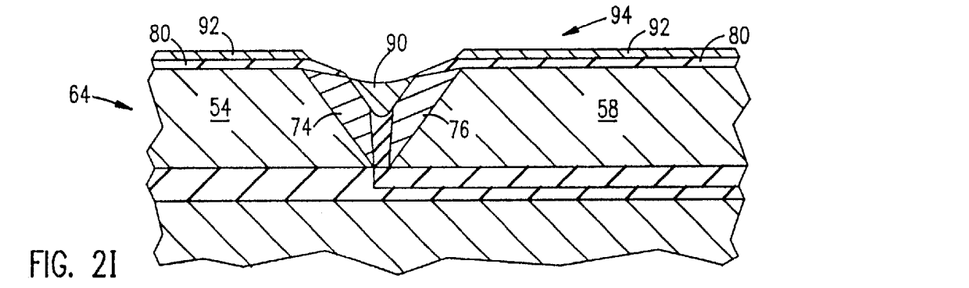
FIG. 2I is a cross-sectional view of the MR element of FIG. 2H after deposition and etching of conductive material between portions of the MR element, according to an embodiment of the present invention.

After the first and second face portions 82, 84 are exposed, a third conductive layer is deposited, a portion of which is then removed to leave a third conductive element 90 and conductive residuum 92. These portions can be removed, for example, by ion milling with rotation of the structure 94 and a beam angle $\phi$ of about zero degrees. The third conductive element 90, being formed between and in electrical contact with the first and second face portions 82, 84, provides an electrical conduit from the first conductive element 54 and the first MR element portion 74, to the second MR element portion 76 and the second conductive element 58.

Figure 2J:
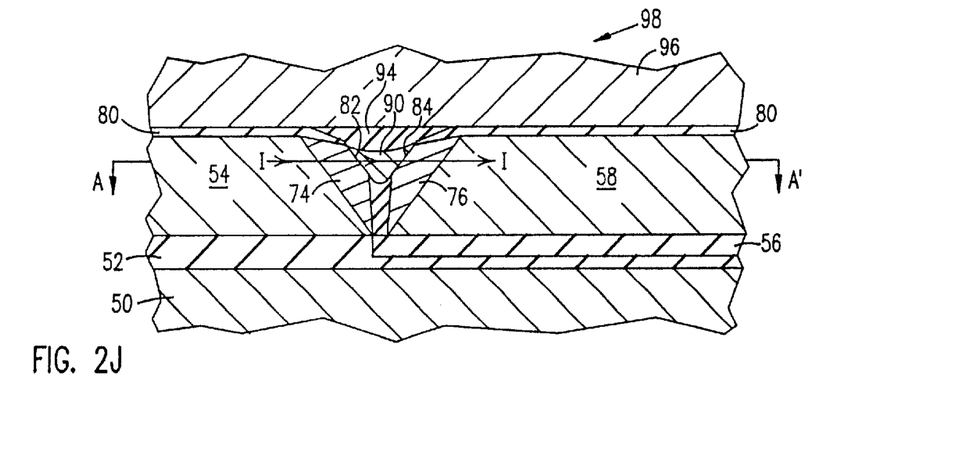
FIG. 2J is a cross-sectional view of the MR element of FIG. 2I after deposition of materials which encapsulate the MR element, according to an embodiment of the present invention.

FIG. 2J shows an insulator 96 that has been filled into the ion milled portion of the third conductive layer to insulate any exposed portion of the MR element portions 74, 76 and the third conductive element 90, from successive layers. When formed of an appropriate material, this also advantageously prevents successive layers deposited above the MR element 72 from bending. For example, aluminum oxide tends to perform both functions well, and various methods known to those skilled in the art can be used to deposit the aluminum oxide, including sputter deposition.

Once the insulator 94 has been deposited, the intermediate structure is planarized, thereby removing the conductive residuum 92 while retaining the MR insulation layer 80 and insulator 94. Thereafter, in a shielded embodiment of the present invention, a second shield layer 96 of ferromagnetic material, such as NiFe, or ferrimagnetic material, such as NiZn, is formed over the MR insulation layer 80 and insulator. As was discussed with regard to the first shield layer 50, the use of a ferrimagnetic material can facilitate reduced read sensor shield-to-shield spacing, and thereby overall read/write head size, without electrical shorting from the sensor to the shields. The second shield layer 96 can be formed by a suitable method known by those skilled in the art, such as sputter deposition or plating. Although not shown, in an unshielded embodiment of the present invention, alumina alternatively can be deposited over the MR insulation layer 80 and insulator 94, to provide separation between the previously formed read sensor and the subsequently formed write element. Subsequently, successive layers are deposited above the second shield layer 96 (or alumina) and defined to form the write element 34 (see FIG. 1C).

With this configuration, a sense current I flowing through the first conductive element 54 will flow through the first MR element portion 74 and pass to the third conductive element 90 through the first face portion 82. The current will continue to flow from the third conductive element 90, through the second face portion 84 of the second MR element portion 76 to the second conductive element 58. Thereby, the sense current I passes through twice as many layers as were deposited in the MR layer 70 of FIG. 2F, while maintaining the shield-to-shield height H (shown in FIG. 1D). Also, due to the angle at which the MR element portions 74 and 76 are oriented with respect to the sense current vector, the MR element portions experience a large current-perpendicular-to-plane (CPP) component. With this large CPP component, the read sensor of the present invention exhibits higher output voltage than sensors having CIP configurations.

As can be seen here, the first and second conductive elements 54, 58 are self-aligned, having been fabricated in aligned positions. This improves the performance of the read element 106 by facilitating uniform current injection from the conductive elements to the MR element. Further, due to the angle θ of the MR element portions relative to the sense current I vector, the MR element cross-sectional area that is normal to the sense current is reduced, thereby increasing the resistance across the MR element portions. With increased resistance, the voltage output is further maximized, thus further contributing to the improved performance of the read sensor of the present invention. The sensor area that is normal to the sense current vector is controlled by the metal layer 64 thickness, which is controlled by the deposited first and second conductive layer thicknesses. In contrast, conventional photolithographic techniques would require 0.05–1 micron imaging techniques, such as X-ray photolithography which is complex and expensive. Thus, the thin film deposition process of the present invention realizes the above mentioned improved performance at less cost and complexity than techniques that are otherwise used.

Figure 3A:
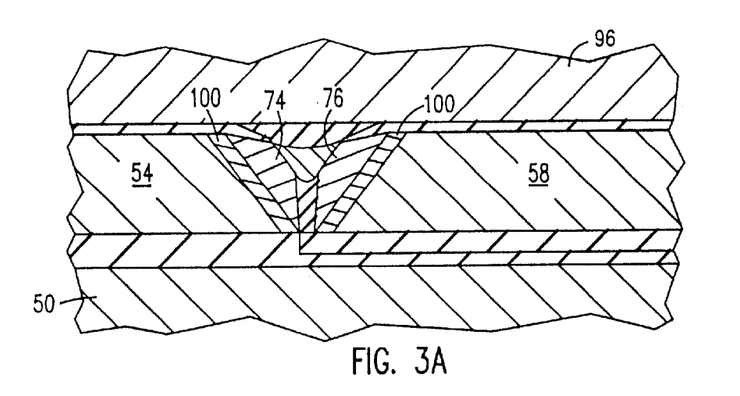
FIG. 3A is a cross-sectional view of the MR element of FIG. 2J incorporating a laminated bias element, according to an embodiment of the present invention.

FIG. 3A is a cross-sectional view of the structure 98 of FIG. 2J, additionally incorporating a laminated bias element 100 which provides proper biasing of the first and second MR element portions 74, 76. The selection of appropriate materials for forming the laminated bias element 100 is well known in the art. The laminated bias element 100 is formed between the first conductive element 54 and the first MR element portion 74, and between the second conductive element 58 and the second MR element portion 76. The formation of the laminated bias element can be accomplished by depositing appropriate biasing material within the groove 68 before the deposition of the MR layer 70. The biasing material is deposited to a thickness of about 0.05 microns to about 0.1 microns. Further, before the MR layer 70 deposition, a portion of the biasing material can be removed to form an appropriate groove into which the MR layer 70 can then be deposited. Advantageously, this configuration results in a substantially uniform hard bias field across the MR element portions.

Figure 3B:
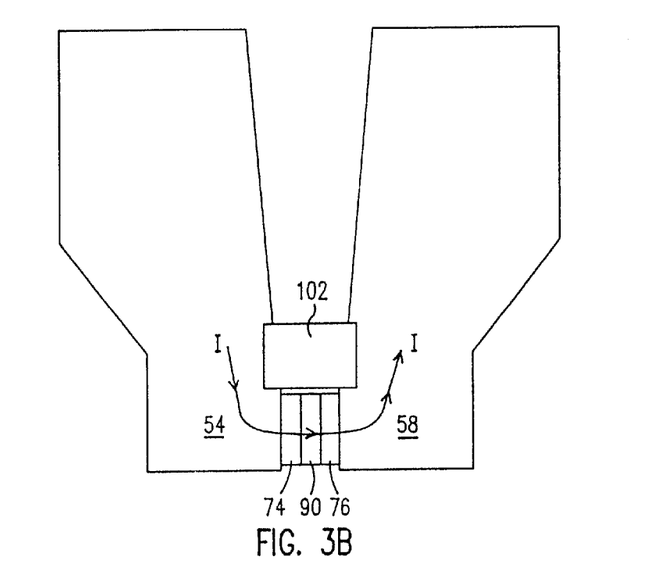
FIG. 3B is a plan view of the read sensor including the MR element of FIG. 2J, incorporating an abutted bias element, according to another embodiment of the present invention.

FIG. 3B is a cross-sectioned plan view along line A–A' of the structure 98 of FIG. 2J, further incorporating an abutted bias element 102. Here, the abutted bias element 102 is located behind and separate from the structure 98, acting as a hard bias to horizontally bias the MR element portions 74, 76. Additionally, the material used is appropriately chosen to provide proper biasing of the first and second MR element portions 74, 76.

Figure 4:
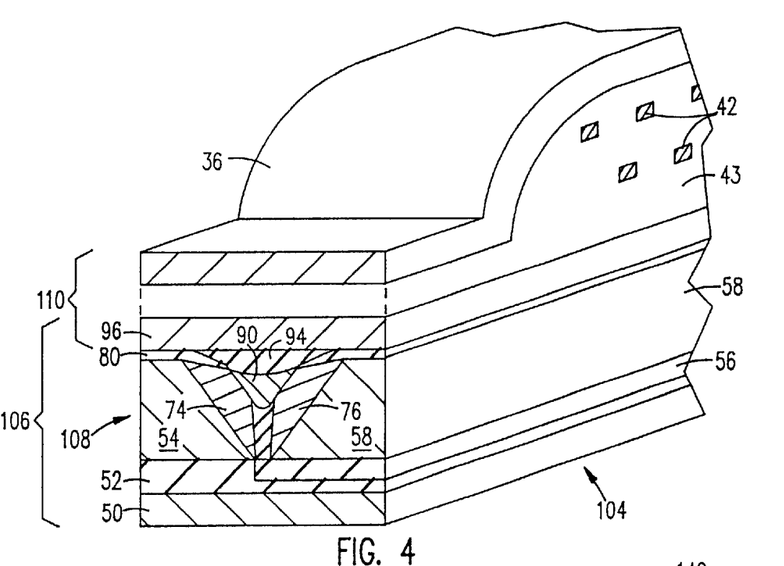
FIG. 4 is a schematic perspective view of a read-write head incorporating the read sensor according to an embodiment of the present invention.

To further understand the present invention, FIG. 4 schematically depicts a perspective view of a read-write head 104 incorporating the structure 98 of FIG. 2J. With the structure 98, the read element 106 includes the read sensor 108, the first shield 50, and the second shield 96. Further, the read sensor 108 includes the first and second MR element portions 74, 76. The remainder of the read/write head 104 is formed above the read element 106, including the dielectric material 43 between the second shield 96, which operates as the first yoke of the write element 110, and the second yoke 36. Additionally, a conductive coil 42 is formed within the dielectric material 43, above which the second yoke 36 is formed.

Figure 5:
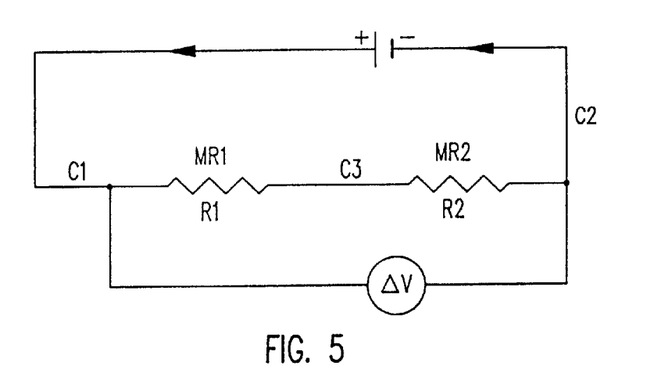
FIG. 5 is a circuit diagram representing the electrical characteristics of the read sensor according to an embodiment of the present invention.

The improved operational characteristics of the present invention can be better understood with reference to FIG. 5. FIG. 5 is a circuit diagram representing the electrical characteristics of the read sensor 108 of the present invention. When a sense current I is introduced to the read sensor 108 through the first conductive element C1 and the second conductive element C2 in the direction indicated by the arrows, the MR element portions MR1 and MR2 exhibit the resistances R1 and R2 (which are substantially equal to each other, or ΔR) in series, while the third conductive element C3 electrically connects MR1 and MR2. Thereby, an output potential ΔV=2ΔR(I) is created between the first and second conductive elements C1, C2. Thus, in this series-oriented embodiment, the output voltage is twice the value that typically would be attained with a single MR element portion.

In an alternative embodiment, a sense current I can be introduced to the MR element through both C1 and C2. With such use, the antiparallel current can partially or entirely cancel the self-bias fields that are induced by the current sources as they are injected through the conductive elements and into the MR element.

Figure 6:
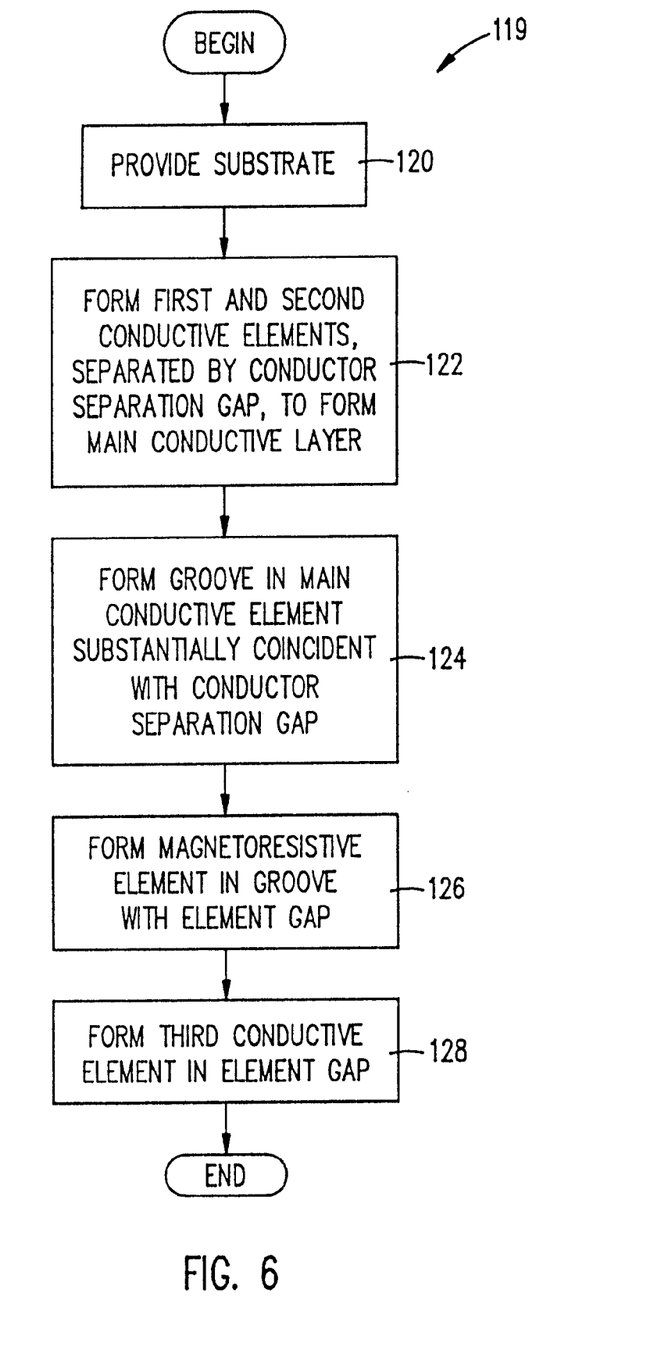
FIG. 6 is a flow chart of a method for fabricating the read sensor according to an embodiment of the present invention.

FIG. 6 is a flow chart of a method 119 for fabricating a read sensor according to another embodiment of the present invention. After providing a substrate in an operation 120, first and second conductive elements are formed on the substrate in an operation 122 to form a main conductive element. The first conductive element is formed by first depositing a first conductive material above the substrate, and then defining the first conductive element. The deposition can be by any suitable method known in the art, such as plating or sputter deposition. The defining of the first conductive element includes exposing a portion of the substrate, and can be done by methods such as photolithography, ion milling or reactive ion etching.

The second conductive element is formed by first depositing a filler material over the first conductive element and the exposed portion of the substrate. A second conductive material is then deposited over the filler material, such that a portion of the filler material is between the first and second conductive elements. Afterward, a lap stop material is deposited over the second conductive material. Sputter deposition or other thin film deposition techniques known in the art can be used for these depositions. Portions of the lap stop material and second conductive material are removed through lapping. This lapping of the lap stop material and second conductive material can be done with chemical mechanical polishing. Further, a conductor separation gap is formed between the first and second conductive elements by removing the filler material between the first and second conductive elements. This can be done through methods such as reactive ion etching.

After the formation of the conductor separation gap, in an operation 124, a groove is formed in the main conductive element, substantially coincident with the conductor separation gap. By ion milling at a particular angle off a plane of the substrate, while rotating the substrate within that plane, portions of the first and second conductive elements are removed. Thereby, the groove is defined by first and second angled walls of the first and second conductive elements, respectively.

In an operation 126, first and second magnetoresistive (MR) element portions are formed on the first and second angled walls. This is accomplished by using known methods to deposit one or more layers of material within the groove. A portion of the one or more layers are then removed to form first and second MR element portions. This removal can be done with methods such as reactive ion etching, or other suitable methods known to those skilled in the art. In one embodiment, these MR element portions are contiguous, while in another embodiment they are separate. In both embodiments, the first and second MR element portions are separated by an element separation gap.

After formation of the first and second MR element portions, in an operation 128 a third conductive element is formed between and electrically connected to both the first and second MR element portions. More specifically, the third conductive element is configured in relation to the MR element portions and other portions of the read sensor, such that an electrical sense current introduced to the read sensor flows in a predominantly current-perpendicular-to-plane mode through the MR element portions. The third conductive element can be formed by depositing a third conductive material into the element gap, through sputter deposition or plating, for example. A portion of the third conductive material is then removed through a process such as ion milling to form the third conductive element.

Figure 7:
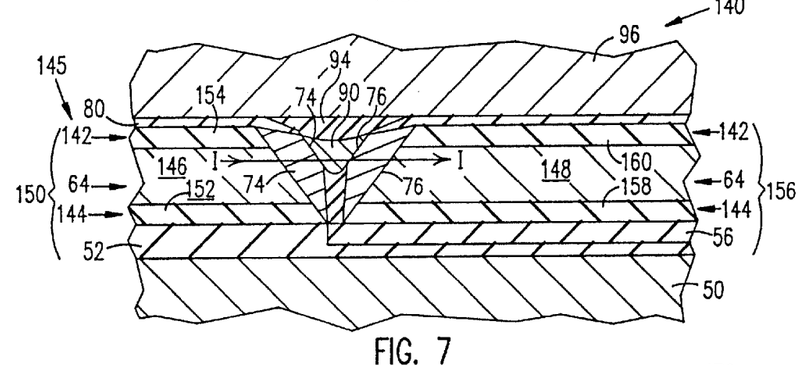
FIG. 7 is a cross-sectional view of a read sensor incorporating current aperture design, according to yet another embodiment of the present invention.

FIG. 7 is a cross-sectional view of a read sensor structure 140 incorporating a current aperture design, according to yet another embodiment of the present invention. Here, a first insulating layer 142 is formed below and contiguous with the metal layer 64, while a second insulating layer 144 is formed above and contiguous with the metal layer 64 to form a conductive layer 145. A first conductive element 150 is formed by depositing a first insulating material 152 above the shield insulation material 52, a first conductive material 146 above the first insulating material 152, and a second insulating material 154 above the first conductive material 146. After etching these three layers through known methods, filler material 56 is deposited over the three layers and the shield insulation layer 52. A second conductive element 156 is formed by depositing a third insulating material 158 above the filler material, a second conductive material 148 above the third insulating material 158, and a fourth insulating material 160 above the second conductive material 148. Using thin film deposition techniques, the first and second conductive materials 146, 148 can be deposited to a thickness of about 0.001 microns to about 0.1 microns. A groove is then formed in the conductive layer 145, defined by a first angled wall 162 and a second angled wall 164 of the first and second conductive elements 150, 156, respectively. Subsequently, operations similar to those described above with reference to FIGS. 2F–2J are performed to fabricate the structure 140.

With this structure, a current aperture is formed through the first and second MR element portions 74, 76 in the region of the metal layer 64 and third conductive element 94. Thereby, a sense current I flowing through the metal layer 64, is substantially confined to a central portion of the first and second MR element portions 74, 76. Thus, the current is significantly limited from flowing through other portions of the first and second MR element portions 74, 76 which could otherwise degrade performance of the read sensor through shunting of the sense current I. This potential disadvantage is well known in the art, and overcome by the current aperture design of this embodiment of the present invention.

As was discussed with reference to the structure of FIG. 2J, the metal layer is self-aligned during the fabrication process, thus facilitating uniform current injection to the MR element portions. However, here the advantage to the fabrication techniques of the present invention are more significantly realized. More specifically, the thin film deposition techniques of the present invention can attain the significantly smaller 0.001–0.05 micron metal layer thickness at lower cost and with less complexity than with conventional photolithography techniques. Also as with the read sensor of FIG. 2J, this embodiment of the present invention may further incorporate a laminated bias (such as the laminated bias 100 of FIG. 3A) or an abutted bias (such as the abutted bias element 102 of FIG. 4).

Figure 8:
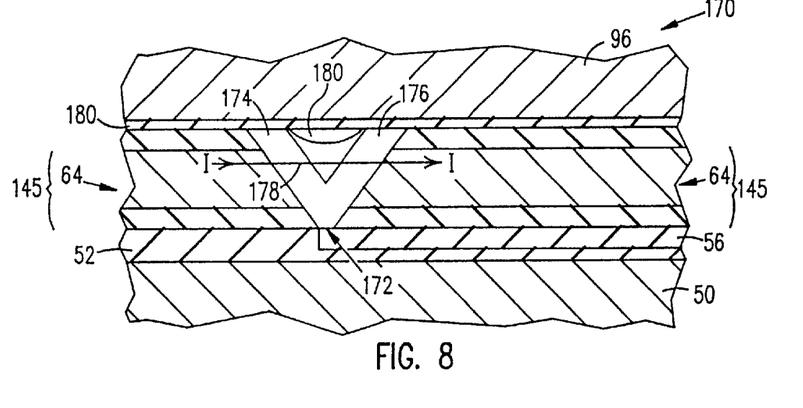
FIG. 8 is a cross-sectional view of a read sensor according to still yet another embodiment of the present invention.

FIG. 8 is a cross-sectional view of a read sensor structure 170 according to still yet another embodiment of the present invention. The conductive layer 145 and groove are formed as described with reference to FIG. 7, after which a magnetoresistive (MR) layer 70 is deposited, as described with reference to FIG. 2F. Thereafter, the surface of the then existing intermediate structure (not shown) is lapped by any suitable process known to those skilled in the art, such as chemical-mechanical polishing (CMP). This results in an MR element 172 having a first MR element portion 174 that is contiguous with a second MR element portion 176. After the lapping process, a third conductive element 178 is formed between the first and second MR element portions 174, 176 through deposition and etching. The remaining open portion of the groove is then filled with an MR insulation material 180, which is also deposited over the entire structure. FIG. 8 further depicts the second shield layer 96 deposited over the planarized insulation material 180. Thus, fewer steps are used, specifically only one ion mill, to form this embodiment of the present invention, saving fabrication time and expense. Additionally, the larger the GMR element, the larger the sensor is parallel to the sense current, and thus the larger the ΔR of the sensor. This provides a larger ΔR/R, and thus exhibits increased performance. Further, fewer edges exist within the read sensor, thus reducing the probability of either electrical or magnetic shorting.

As with the structure shown in FIG. 7, a current aperture is formed through the first and second MR element portions 174, 176 in the region of the metal layer 64 and third conductive element 178. Thereby, a sense current I flowing through the metal layer 64, is substantially confined to a central portion of the first and second MR element portions 174, 176. Thus, the current is significantly limited from flowing through other portions of the first and second MR element portions 174, 176 which could otherwise degrade performance of the read sensor through shunting of the sense current I. As was pointed out with reference to the structure of FIG. 7, this potential disadvantage is well known in the art, and overcome by the current aperture design of this embodiment of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of fabricating a magnetoresistive device that is capable of reading data that is recorded on magnetic media, said method comprising:

providing a substrate;

forming a first conductive element on said substrate;

forming a second conductive element on said substrate to form a main conductive layer along with said first conductive element, said first and second conductive elements being separated by a conductor separation gap;

forming a groove in said main conductive layer substantially coincident with said conductor separation gap, defined by a first angled wall and a second angled wall of said first and second conductive elements, respectively;

forming a magnetoresistive element within said groove and in electrical contact with said first and second conductive elements, forming a third conductive element within said element gap, such that when an electrical current is passed through said main conductive layer, said electrical current passes through said third conductive element and through said magnetoresistive element with a current-perpendicular-to-plane component.

2. The method as recited in claim 1, wherein said forming said first conductive element comprises:

depositing a first conductive material above said substrate; and defining said first conductive element from said first conductive material, including exposing a portion of said substrate adjacent to said first conductive element.

3. The method as recited in claim 2, wherein said forming said second conductive element comprises:

depositing filler material over said first conductive element and over a portion of said substrate;

depositing a second conductive material over said filler material;

depositing lap stop material over said second conductive material;

lapping said lap stop material and said second conductive material to remove a portion of said second conductive material that lies over said first conductive element, and to remove a portion of said lap stop material that lies over said portion of said second conductive material; and removing said filler material.

4. The method as recited in claim 3, wherein said forming said first conductive element further comprises:

depositing a first insulating material above said first side of said substrate before depositing said first conductive material, and depositing a second insulating material above said first conductive material after depositing said first conductive material, wherein said defining said first conductive element is also from said first and second insulating materials; and wherein said forming said second conductive element further comprises depositing a third insulating material above said filler material before depositing said second conductive material, and depositing a fourth insulating material above said second conductive material after depositing said second conductive material.

5. The method as recited in claim 4, wherein said forming said first and second portions of said magnetoresistive element comprises:

depositing a plurality of layers of materials over said first and second conductive elements and within said groove formed between said first and second conductive elements, said materials and an order of said plurality of layers being appropriate to achieve particular magnetoresistive properties; and removing a portion of said plurality of layers by chemical mechanical polishing a portion of said plurality of layers that overlies said first and second conductive elements, while retaining a portion of said plurality of layers that is in said groove.

6. The method as recited in claim 1, wherein said forming said groove comprises:

removing a portion of said first conductive element and a portion of said second conductive element by ion milling said first and second conductive elements, said ion milling being directed at approximately perpendicular to a top surface of said conductive elements.

7. The method as recited in claim 1, wherein said forming said magnetoresistive element comprises:

depositing a plurality of layers of materials over said first and second conductive elements and within said groove formed between said first and second conductive elements, said materials and an order of said plurality of layers being appropriate to achieve particular magnetoresistive properties; and removing a portion of said plurality of layers.

8. The method as recited in claim 1, further comprising forming a bias element for biasing said magnetoresistive element.

9. The method as recited in claim 8, wherein forming said bias element includes depositing bias material within said groove before forming said magnetoresistive element.

* * * * *